United States Patent [19]

Holland

[11] Patent Number: 5,462,785

[45] Date of Patent: Oct. 31, 1995

[54] LIQUID HYDROCARBON SORBING AND SOLIDIFYING PILLOW

[76] Inventor: Herbert W. Holland, 2314 Chimney Rock, Houston, Tex. 77056

[21] Appl. No.: 222,844

[22] Filed: Apr. 5, 1994

[51] Int. Cl.[6] ............................................. B32B 3/00
[52] U.S. Cl. ............................ 428/76; 428/195; 428/72; 210/924
[58] Field of Search ............................ 588/249, 252, 588/255; 210/242.4, 484, 693, 924; 428/68, 71, 72, 76, 102, 195

[56] References Cited

U.S. PATENT DOCUMENTS

| | | | |
|---|---|---|---|
| 3,563,837 | 2/1971 | Smith et al. | 428/71 |
| 3,904,528 | 9/1975 | Yocum | 210/924 X |
| 4,360,021 | 11/1982 | Stima | 428/72 X |
| 4,497,712 | 2/1985 | Cowling | 210/924 X |
| 4,797,310 | 1/1989 | Barby et al. | 428/71 |
| 4,826,030 | 5/1989 | Valley | 428/71 X |
| 4,862,539 | 9/1989 | Bokich | 428/71 X |
| 5,135,792 | 8/1992 | Hogan | 428/76 X |
| 5,139,151 | 8/1992 | Chelak | 428/71 X |
| 5,186,831 | 2/1993 | De Petris | 210/242.4 |
| 5,227,072 | 7/1993 | Brinkley | 210/693 X |
| 5,308,665 | 5/1994 | Sadek et al. | 428/76 X |
| 5,356,678 | 10/1994 | Heitzhaus et al. | 428/76 X |
| 5,360,653 | 11/1994 | Ackley | 428/71 |

FOREIGN PATENT DOCUMENTS 15362 10/1991 WIPO ........................................ 428/72

Primary Examiner—John A. Ricci

[57] ABSTRACT

A device for collection and containment of spilled or leaked liquid hydrocarbons absorbs pollutants that come in contact. The absorbed material is solidified within the pillow into a rubber-like mass. The consolidated mass will float indefinitely and is easily retrieved and handled for disposal. The solidified hydrocarbons will not leech when exposed to pressure limits used to determine landfill suitability.

14 Claims, 4 Drawing Sheets

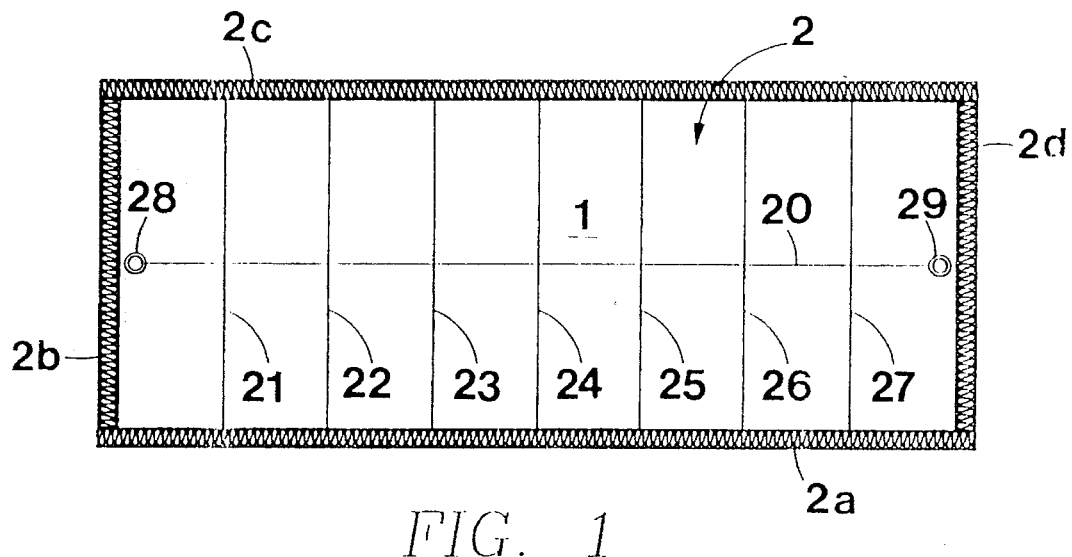
FIG. 1
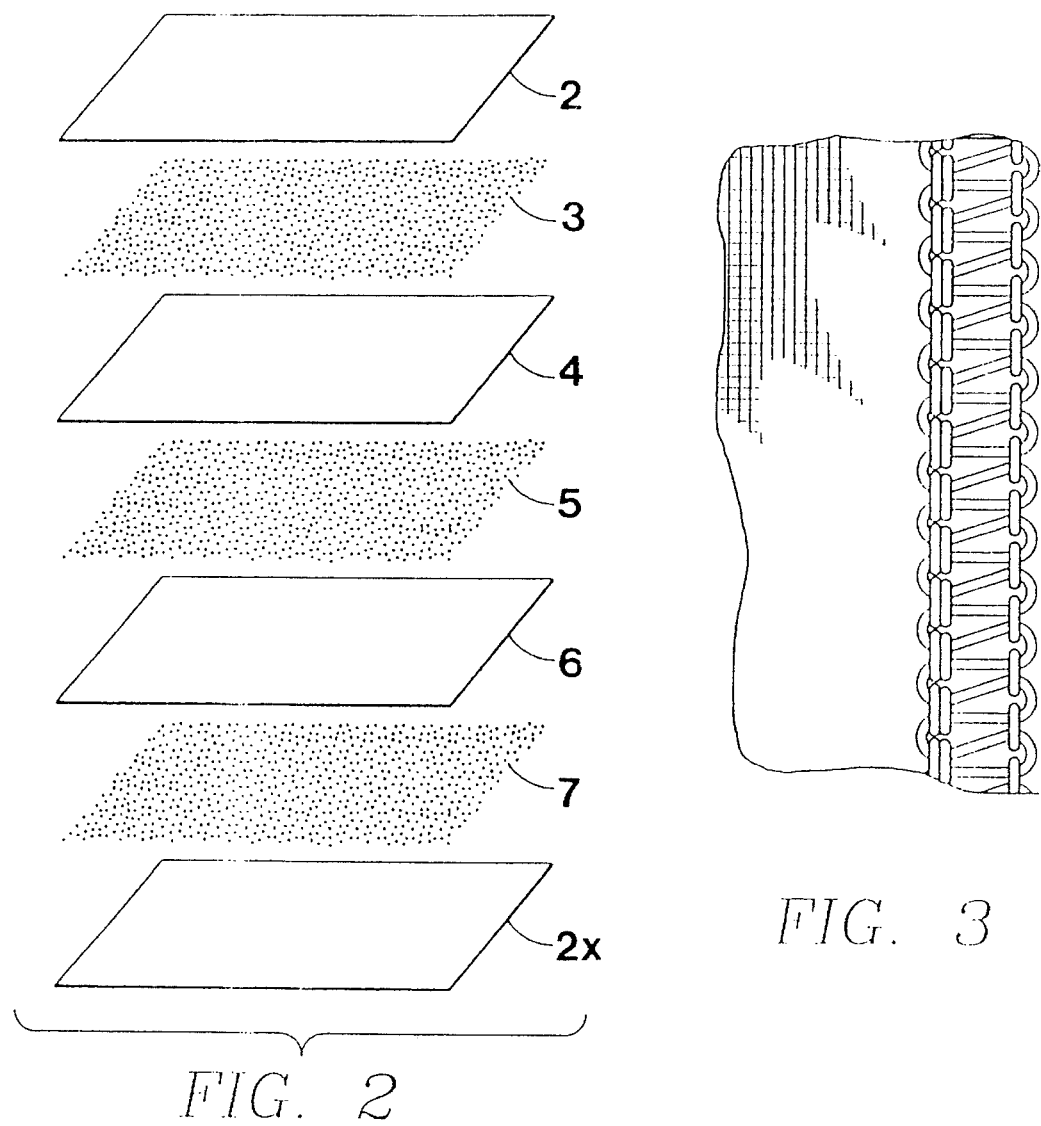
FIG. 2
FIG. 3

5,462,785

LIQUID HYDROCARBON SORBING AND SOLIDIFYING PILLOW

BACKGROUND OF THE INVENTION

The present invention relates to absorbent devices for use in commercial applications for the absorption and containment of spilled or leaked hydrocarbons, incorporating additionally an ecologically-safe removal and disposal procedure for such leaks and spills.

In a broad range of commercial applications, there is a need to contain and remove liquid hydrocarbons that are spilled or leaked into the environment as part of the routine maintenance and operation of a wide variety of equipment that rely on liquid hydrocarbon products for fuel and lubrication. This is a critically important task necessary to prevent pollution of the environment, by for example, entry into the adjacent water column as the spilled or leaked liquid hydrocarbons seep through the ground or allowing the hydrocarbons to flow downstream as waste water runoff.

One common approach to the task is to use an absorbent device to contain such spills. A wide variety of components, including items such as cotton, peat moss, rice hulls and ground-up corn cobs are used in the fabrication of these devices. One such device relies on ground-up chicken feathers encased in a cotton pillow case. The largest class of sorbent devices are typically composed of a group of non-woven, petro-chemical based fabric materials having the physical properties of absorbing liquid hydrocarbons while repelling water. These devices can be packaged as a flat pad or sheet, or can be rolled into a long cylindrical boom for placement to absorb and retain leaks and spills caused by the equipment. They are also packaged as strips of the non-woven fabric encased in an open weave plastic net, resulting in a sausage-like boom.

In each instance, these devices are placed in areas where liquid hydrocarbons accumulate, extracting the liquid hydrocarbons from the area.

Prior art absorbent devices of this type are subject to the release of the absorbed liquid hydrocarbons by gravity, column weight or outside forces exerting pressure on such devices as they are removed from the liquid hydrocarbon containment area. Disposal of these devices results in the displacement of a substantial volume of the absorbed liquid hydrocarbon pollutants from one environment to another.

SUMMARY OF THE INVENTION

In accordance with the present invention, an absorbent device is provided which not only absorbs liquid hydrocarbons, but also quickly and irreversibly solidifies the absorbed liquid hydrocarbons into an easily retrievable solid rubber-like mass. The device is formed as a pillow from a textile material sewn to form layered chambers in stratification contained within an outer envelope layer which defines the overall pillow shape. A seam is placed longitudinally along the center axis of the pillow, creating two columns of stratified pockets. Additional cross-seams are placed at evenly spaced intervals laterally from one side of the pillow to the opposite side of the pillow, crossing the center axis seam of the pillow in a perpendicular or an oblique orientation to the center axis of the pillow. This seaming results in a quilting effect which produces a calculated number and arrangement of chambers containing an approximately equal amount of solidifying polymer. The design and spacing of the seams creates multiple consolidation points of the stratified layers, the consolidation points acting as flow channels and defining multiple compartmented absorption cells facilitating and hastening the migration of the spill or leak to the solidifying polymer, followed by the complete absorption and solidification of the spill or leak.

The seaming of the textile material components of the device can be accomplished by several methods including mechanical stitching, thermal sealing and ultra-sonic fusing. These seaming methods are used to seal the perimeter of the pillow, produce the individual chambers of solidifying polymer and unite the stratified internal layers with the outer envelope. The joining of the layers of textile material results in a series of consolidation points of the layers of textile material and creates the flow channels throughout the body of the pillow for the migration of spills and leaks to the absorptive cells within the pillow.

The solidifying polymer can be placed in the pillow using any of several different methods. As a first example, the polymer, in its granular form, can be placed in equally measured amounts, into the open end of the pillow after three sides of the pillow have been seamed and the center longitudinal axis seam has been placed to form side-by-side elongated pockets. The inserted polymer collects at the bottom of the pocket and a cross-seam is placed to form a polymer-filled chamber. The step of introducing polymer into the open end of the pillow, then sealing it into the chambers by placing a cross-seam is repeated until all the stratified chambers have been formed to create a matrix arrangement of polymer-filled chambers stratified within the outer envelope of the pillow. The seaming to form the matrix of chambers also acts to provide the quilting effect desired for increasing the rate of migration of the hydrocarbons to the interior of the pillow by the creation of consolidation points and flow channels.

Other methods of stratifying and sealing the solidifying polymer within the outer envelope of the device can be used. One method calls for the solidifying polymer to be encased and sealed within individual bags of single layer textile material, these bags being filled and sealed in an assembly-line fashion. Each bag, filled with a measured amount of the solidifying polymer is sealed to form a solitary chamber of solidifying polymer within a single layer of textile material. Individual bags are then arranged side-by-side in a matrix configuration of rows and columns to produce a single layer of bags conforming to the designated perimeter dimensions of the finished pillow. Identical layers of the arrangement of polymer-filled bags are duplicated and then stratified over the first layer of bags to produce the required thickness of the pillow. Each layer of the arrangement of bags is positioned so the perimeter of the overall shape of the layer and the side-by-side intersections of the matrix of bags in each layer are aligned in substantial registration with the corresponding perimeter of the arrangement of bags and the side-by-side intersections of the arranged bags of the other layers. The stratified layers of individual polymer-filled bags are then enclosed within an outer envelope of textile material and sealed within the perimeter of the outer envelope. The intersections of the individual polymer-filled bags of the stratified layers are seamed to the outer envelope of the pillow, creating the longitudinal and cross-seams of the pillow used as flow channels and consolidating points of the stratified layers. The result is the required quilting effect integral to the concept.

The solidifying polymer can also be suspended within the fibers of a textile material as they are being formed, or attached to the textile material. The suspending of the polymer is accomplished by incorporating the polymer into the body of the fabric during the process used to form the textile material. This process is normally used in the production of melt-blown or spunbonded textiles. The manufacturing of a synthetic textile fabric material starts with raw petro-chemical based pellets, such as polypropylene, being blended with pigments and/or additives. This mixture is heated to the melting point of the pellets and extruded into filaments. The filaments are drawn and attenuated, using high velocity air to align the polymer molecules and maximize fiber strength. The resulting continuous, high tenacity filaments are formed into a web on a moving conveyor screen and thermally fused together with a bonding system to maximize the strength and surface stability of the fabric. The polymer is suspended within the fabric by adding it to the mix of raw petro-chemical based pellets, pigments and additives, melting the mixture and extruding filaments from the mixture. This method incorporates the polymer into the body of the filaments as they are formed.

The polymer is also suspended within the fabric by injecting an evenly distributed amount of the polymer at an intermediate point as the web of filaments are formed on the conveyor screen As the filaments are thermally fused together with the bonding system, the polymer is trapped within the fused filaments, becoming a component of the finished textile fabric material.

An evenly distributed, measured amount of the polymer can also be attached to textile material by using an adhesive to bond the polymer to a layer of material. These layers of textile material holding the polymer within its web of filaments or bonded to the polymer are stratified between two layers of textile material forming the outer envelope of the pillow, and seamed within the perimeter of the outer envelope of the pillow. Longitudinal and lateral seams are then added to the pillow to produce the desired quilting effect.

In each instance, the solidifying polymer is stratified and arranged between layers of textile material within the pillow formed by the outer envelope, with additional seams providing a quilting effect for the entire pillow.

The quilting of the pillow creates a series of continuous consolidation points of the internally stratified layers of textile material within the pillow envelope. The textile material absorbs the spilled or leaked liquid hydrocarbons on contact. This action, coupled with the continuous consolidation points of the internal and external layers of textile material and the unique stratification design of the chambered pillow speeds migration of the liquid hydrocarbons through the flow channels created by the quilting seams throughout the interior of the pillow via the capillary attraction of the liquid hydrocarbons to the textile material. The result is a uniform distribution of the liquid hydrocarbons throughout the entire structure of the pillow for absorption and solidification of the liquid hydrocarbons by the alternating layers of solidifying polymer within the stratified layers of the pillow.

Typically, the density and weight of the internal layers of stratified, textile material is substantially less than the density and weight of the textile material used to form the outer envelope of the pillow. This is done to reduce the volume of liquid hydrocarbons that may be retained within the textile material segments of the pillow in the event the volume of the spill the pillow is being used to sorb is in excess of the capacity of the solidifying polymer within the pillow. Pillows fabricated of thinner textile materials of less dense construction characteristically retain a smaller volume of liquid hydrocarbons within the textile material components of the pillow than pillows fabricated using heavier textile materials of greater density.

Chemical composition, thickness and density of the fibers utilized in the composition of a textile material play a critically governing role in controlling the rate of absorption and the ratio of retention of the liquid hydrocarbons being sorbed by the material. Textile materials formed by using a greater density of thicker fibers are sturdier, more resistant to tearing and will sorb and retain greater volumes of liquid hydrocarbons than textile materials composed of thinner fibers or formed in a less dense configuration. Thus, a heavier material is used for the outer envelope to add to the structural integrity and durability of the envelope while lighter textile material is used internally to form the stratified chambers of solidifying polymer. The migration of the sorbed liquid hydrocarbons throughout the interior of the pillow via the capillary attraction of the liquid hydrocarbons to the textile material remains a characteristic while the level of retention of the liquid hydrocarbons diminishes.

BRIEF DESCRIPTION OF THE DRAWINGS

The accompanying drawings illustrate the preferred embodiments of the invention in which:

FIG. 1 is a top view of a first embodiment of a device in accordance with the present invention showing its pillow-shaped envelope form, the seams creating consolidation points of the outer envelope with the internally stratified layers of textile material along the longitudinal and lateral axis of the device, and the seams sewn on four sides;

FIG. 2 is an exploded illustration of the first embodiment of the device in FIG. 1, showing alternating layers of textile material and solidifying polymer are arranged to conform to the desired dimensions of the pillow and stratified to the desired thickness of the pillow within an outer envelope of textile material;

FIG. 3 shows the detail of the overlock seam used to consolidate the internally stratified layers of textile material with the outer envelope of the pillow and to seal the stratified layers of polymer within the perimeter of the device in FIG. 2;

DESCRIPTION OF THE PREFERRED EMBODIMENTS

Figure 4:
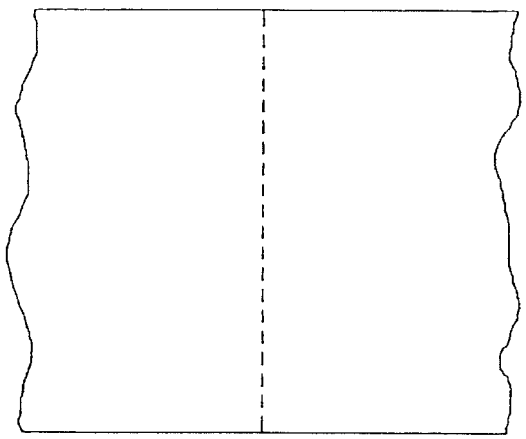
FIG. 4 shows the detail of the seam used along the longitudinal axis and the cross-seams of the pillow to consolidate the internally stratified layers of textile material with the outer envelope of the device in FIG. 2.

In FIG. 1, an absorbent device 1 in accordance with the present invention is shown in a pillow-shaped configuration formed by an envelope 2 with seaming of the four sides 2a, 2b, 2c, and 2d. This seam is shown in greater detail in FIG. 3. A longitudinal seam 20 is shown sewn along the center axis of the pillow, and lateral seams 21, 22, 23, 24, 25, 26, and 27 are shown sewn at evenly spaced intervals from one side of the pillow to the opposite side of the pillow and crossing the longitudinal seam along the center axis seam of the pillow in a perpendicular orientation. These seams are shown in greater detail in FIG. 4. Grommets 28 and 29 are placed on the longitudinal seam along the center axis seam of the pillow on each end of the pillow, providing an attachment point to allow the user to tether the device in place or serve as a connecting point with other pillows to form a continuous boom.

FIG. 2 is an exploded illustration of the first embodiment of the device in FIG. 1, showing alternating layers of textile material 4 and 6 and solidifying polymer 3, 5, and 7 in a stratified arrangement between the layers of textile material 2 and 2x comprising the outer envelope of the device.

Figure 5:
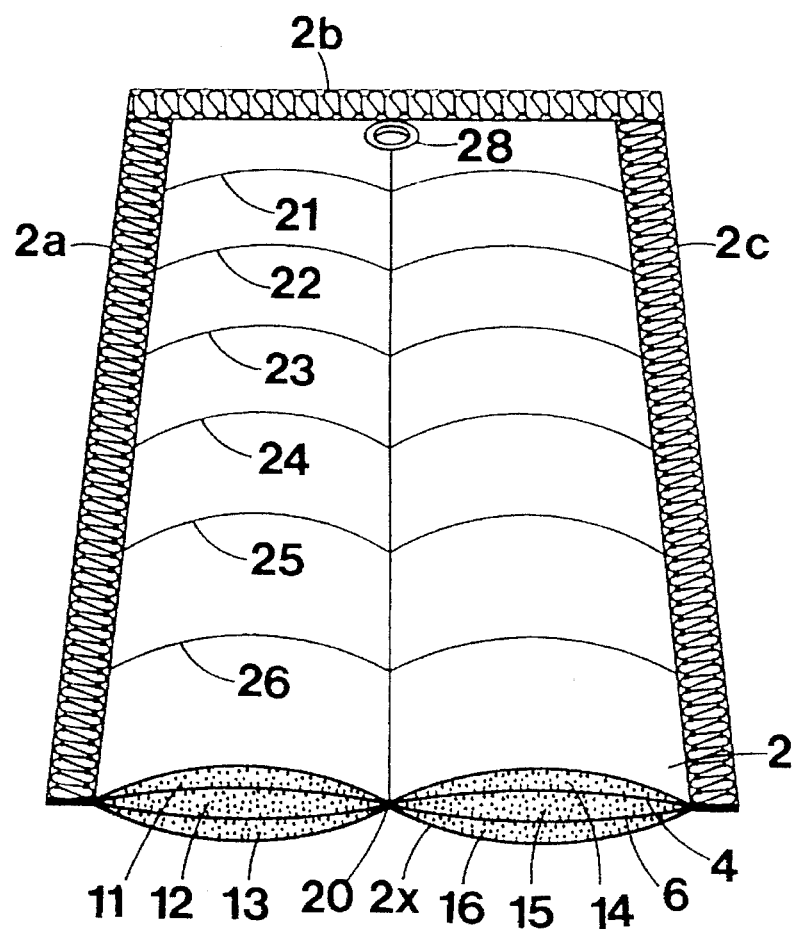
FIG. 5 shows a cross section of the first embodiment of the device in FIG. 1, indicating the chambers filled with polymer separated by the textile material and the consolidation of the outer envelope with the internal layers of textile material at the edges and at the seam along the center axis of the pillow.

Referring to FIG. 5, the cross section of the first embodiment of the pillow prior to closure at seam 2d reveals the stratification design of the pillow achieved by stacking pieces of textile material 2, 4, 6, and 2x and seaming them at points 2a, 2b and 2c using the overlock seam illustrated in FIG. 3. The resulting pockets are arranged one on top of another and enclosed by a common outer envelope of layers 2 and 2x. Next, a seam 20 is sewn along the center axis of the pillow, providing a line of additional consolidating points of the internally stratified layers of textile material with the outer envelope of the pillow along its longitudinal axis and creating two columns of pockets 11, 12, and 13 and 14, 15, and 16 within the device. FIG. 5 shows the effect of alternate multi-layering of textile material layers 2, 4, 6 and 2x and the consolidation of the layers along seams 2a, 2b, 2c and 20 to form pockets 11, 12, 13, 14, 15, and 16. These pockets are then filled with polymer and sealed into the body of the pillow, resulting in an arrangement of stratified polymer-filled chambers.

The polymer is inserted into the device by placing a measured amount of the polymer in each pocket at the open end of the device and allowing the polymer to drop through the pockets until it is contained by seam 2b. The polymer is then sealed in the pockets with lateral seam 21, sewn from seam 2a to seam 2c and crossing seam 20 at a perpendicular angle. Seam 21 seals the polymer into chambers and creates an additional line of consolidation points of the layers of textile material. The sealing of the polymer into chambers results in an even distribution of the polymer throughout the device as it prevents loose polymer from migrating throughout the body of the device and clustering in a few areas.

The filling process is repeated, allowing the polymer to drop through the pockets until it is contained by seam 21 with seam 22 sewn to form the next section of stratified polymer-filled chambers. The process is repeated until the last section of pockets is filled with polymer. The last section of polymer-filled chambers and the pillow is seamed shut by seam 2d.

The internally stratified layers of textile material are consolidated with the outer envelope of the pillow at the seams 2a, 2b, 2c and 2d around the perimeter of the pillow, and at seams 20, 21, 22, 23, 24, 25, 26, and 27 along the longitudinal and lateral axes of the device. This allows liquid hydrocarbons that come in contact with the Outer envelope layers of textile material 2 and 2x to migrate via the seams 2a, 2b, 2c, 2d, 20, 21, 22, 23, 24, 25, 26, and 27 under capillary attraction to the interior layers of textile material 4 and 6 and propagate throughout the pillow.

In accordance with the first embodiment directed to containment sumps and the like, the pillow envelope 2 measures 48"×6"×¼". Each pillow chamber contains approximately 8 grams by weight of the solidifying polymer material for an approximate total weight of 1008 grams of polymer in the pillow. The textile material is preferably a petro-chemical based fabric such as polypropylene, polyester or nylon. The polymer material is preferably an organic elastomer polymer under the trademark Waste-Set 3200, Waste-Set 3400, Nochar A610, Nochar A650, Enviro-Bond 403, Norsorex APX1, H-100 Environmental Spill Encapsulant or an equivalent.

Figure 6:
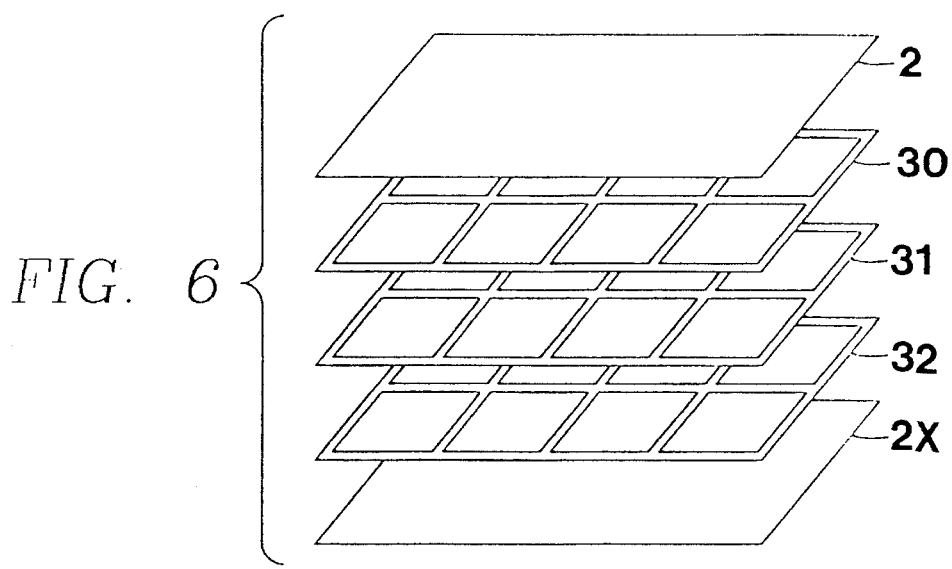
FIG. 6 is an exploded illustration of a second embodiment of the device in FIG. 1 in accordance with the present invention wherein the polymer is encased in a plurality of rectangular single-layer bags arranged to conform to the desired dimensions of the pillow and stratified to the desired thickness of the pillow with the junctions of the individual polymer-filled bags of each layer being in substantial registration with the corresponding junctions of individual polymer-filled bags of the other layers within an outer envelope of textile material.

FIG. 6 is an exploded illustration of the second embodiment of the device in FIG. 1, showing stratified layers of individual polymer-filled bags 30, 31 and 32 in a stratified arrangement between the layers of textile material 2 and 2x comprising the outer envelope of the device.

In accordance with a modification of the second embodiment, the layers of textile material 2 and 2x comprising the outer envelope of the device can be eliminated from the structure. If this form of the second embodiment is implemented, the typical density of the material for the individual bags may be on the order of 2.0 ounce. A suitable material for use is polypropylene or a similar synthetic fabric. Thus, with reference to FIG. 6, the modified device would include the layers of individual polymer-filled bags 30, 31 and 32 in the same stratified arrangement, but without the layers of textile material forming the outer envelope. Of course, the consolidation and seaming of the stratified layers that results in a quilting effect (see FIG. 8) remains applicable to the modified second embodiment without an outer layer.

Figure 7:
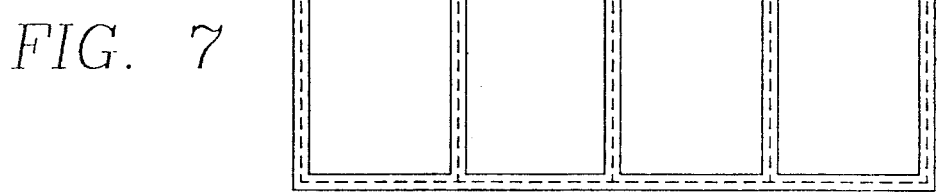
FIG. 7 shows a series of polymer-filled and sealed bags of single layer fabrication joined by an ultra-sonic seam. This method of seaming is used to encase the polymer in each of the individual bags, to seal the stratified layers of individual polymer-filled bags within the outer envelope of textile material along the perimeter of the pillow and to create the consolidation seams of the outer envelope of textile material with the substantially registered junctions of the stratified layers of individual polymer-filled bags of the device in FIG. 6.
Figure 8:
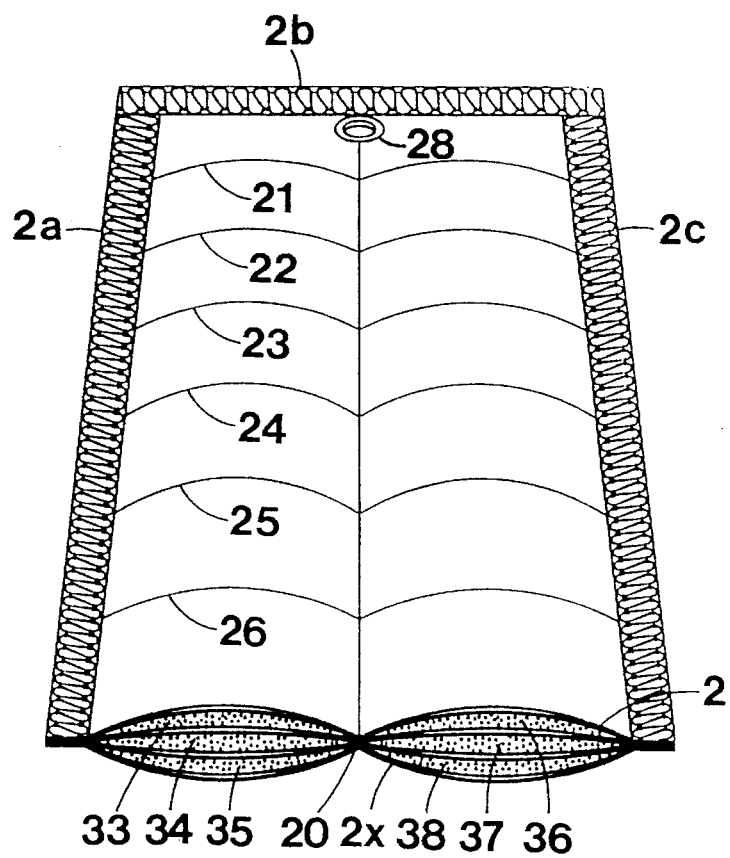
FIG. 8 shows a cross section of the second embodiment of the device in FIG. 1, indicating the stratified layers of individual polymer-filled bags encased within the outer envelope of textile material and the consolidation of the outer envelope with the outer edges and the internal junctions of the substantially registered stratified layers of individual polymer-filled bags.

Referring to FIG. 7, a series of polymer-filled and sealed bags of single layer textile material are shown joined by ultra-sonic seams. This method of seaming is used to encase the polymer in each of the individual bags, to seal the stratified layers of individual polymer-filled bags within the outer envelope of textile material along the perimeter of the pillow and to create the consolidation seams of the outer envelope of textile material with the substantially registered junctions of the stratified layers of individual polymer-filled bags of the device in FIG. 6;

Referring to FIG. 8, the cross section of the second embodiment of the device prior to closure at seam 2d reveals the stratification design of the pillow achieved by stratifying layers of individual polymer-filled bags 33, 34, 35, 36, 37 and 38 between outer envelope layers of textile material 2 and 2x. The ultra-sonic seam illustrated in FIG. 7 is used to consolidate the outer edges of the internal layers of polymer-filled bags with the outer edges of the textile material forming the outer envelope of the device along seams 2a, 2b and 2c. Seam 20 is sewn along the center axis of the pillow and seams 21, 22, 23, 24, 25, 26 and 27 are sewn laterally across the pillow to consolidate the outer envelope layers with the internal layers along the junctions of the substantially registered stratified layers of individual polymer-filled bags.

FIG. 8 shows the effect of the stratified layering of individual polymer-filled bags 33, 34, 35, 36, 37 and 38 between the outer envelope layers of textile material 2 and 2x and the consolidation of the layers along seams 2a, 2b, 2c and 20 21 22, 23, 24, 25 and 26 to form an arrangement of polymer-filled chambers within the body of the device. The internally stratified layers of individual polymer-filled bags are consolidated with the outer envelope of the pillow at the seams 2a, 2b, 2c and 2d around the perimeter of the pillow, and at seams 20, 21, 22, 23, 24, 25, 26, and 27 along the longitudinal and lateral axes of the device.

These seams allow liquid hydrocarbons that come in contact with the outer envelope layers of textile material 2 and 2x to migrate via the seams 2a, 2b, 2c, 2d, 20, 21, 22, 23, 24, 25, 26, and 27 under capillary attraction to the interior layers of individual polymer-filled bags 33, 34, 35, 36, 37 and 38 and propagate throughout the pillow.

In accordance with the second embodiment directed to containment sumps and the like, the pillow envelope 2 measures 48"×6"×¼". Each pillow chamber contains approximately 12 grams by weight of the solidifying polymer material for an approximate total weight of 576 grams of polymer in the pillow. The textile material is preferably a petro-chemical based fabric such as polypropylene, polyester or nylon. The polymer material is preferably an organic elastomer polymer under the trademark Waste-Set 3200, Waste-Set 3400, Nochar A610, Nochar A650, Enviro-Bond 403, Norsorex APX1, H-100 Environmental Spill Encapsulant or an equivalent.

Figure 9:
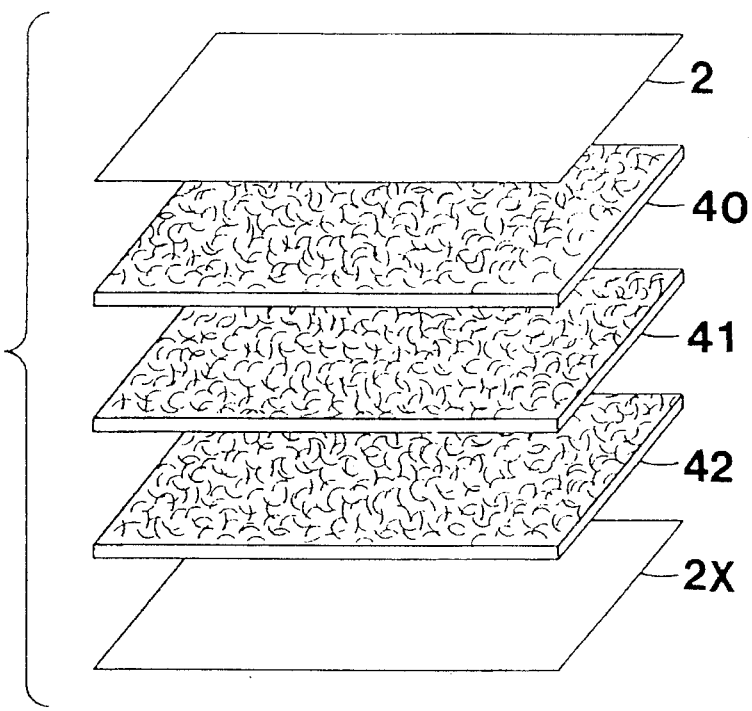
FIG. 9 is an exploded illustration a third embodiment of the device in FIG. 1 in accordance with the present invention wherein layers of textile material, with an evenly distributed, measured amount of polymer suspended within the web of filaments of the textile material, are arranged and stratified to conform to the desired dimensions of the device within an outer envelope of textile material.

FIG. 9 is an exploded illustration of the third embodiment of the device in FIG. 1, showing layers of solidifying polymer suspended in textile material 40, 41 and 42 in a stratified arrangement between the layers of textile material 2 and 2x comprising the outer envelope of the device.

In accordance with a modification of the third embodiment, the layers of textile material 2 and 2x comprising the outer envelope of the device can be eliminated from the structure. If this form of the third embodiment is implemented, the typical density of any single layer of polymer suspended in textile material may be on the order of 2.0 ounce. A suitable material for use is polypropylene or a similar synthetic fabric. Thus, with reference to FIG. 9, the modified device would include the layers of polymer suspended in textile material 43, 44 and 45 in the same stratified arrangement, but without the layers of textile material forming the outer envelope. Of course, the consolidation and seaming of the stratified layers that results in a quilting effect (see FIG. 10) remains applicable to the modified third embodiment without an outer layer.

Figure 10:
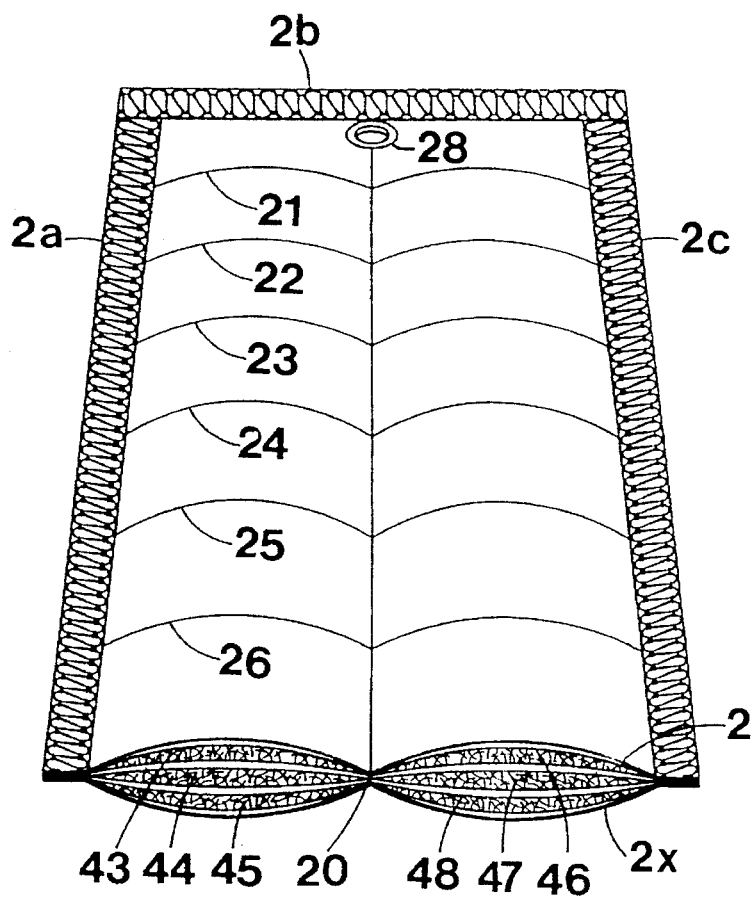
FIG. 10 shows a cross section of the third embodiment of the device in FIG. 1, indicating the layers of textile material, with an evenly distributed, measured amount of polymer suspended within the web of filaments of the textile material, arranged in stratification within an outer envelope of textile material with the internally stratified layers of textile material and suspended polymer and the outer envelope consolidated by seaming at the edges and along the center axis of the device.

Referring to FIG. 10, the cross section of the third embodiment of the device prior to closure at seam 2d reveals the stratification design of the pillow achieved by stratifying layers of polymer suspended in textile material 43, 44 and 45 between outer envelope layers of textile material 2 and 2x and seaming them at points 2a, 2b and 2c using the overlock seam illustrated in FIG. 3. Seam 20 is sewn along the center axis of the pillow, providing a line of additional consolidating points of the internally stratified layers of polymer suspended in textile material with the outer envelope of the pillow along its longitudinal axis and creating two columns of internally stratified layers of polymer suspended in textile material 43, 44 and 45, and 46, 47 and 48 within the device. FIG. 10 shows the effect of the stratified layering of polymer suspended in textile material 43, 44 and 45, and 46, 47 and 48 between the outer envelope layers of textile material 2 and 2x and the consolidation of the layers along seams 2a, 2b, 2c and 20, 21, 22, 23, 24, 25 and 26 to form an arrangement of polymer-filled chambers within the body of the device.

These seams allow liquid hydrocarbons that come in contact with the outer envelope layers 2 and 2x to migrate via the seams 2a, 2b, 2c, 2d, 20, 21, 22, 23, 24, 25, 26, and 27 under capillary attraction to the interior stratified layers of polymer suspended in textile material 43, 44 and 45, and 46, 47 and 48 and propagate throughout the pillow.

In accordance with the third embodiment directed to containment sumps and the like, the pillow envelope 2 measures 48"×6"×¼". Each layers of polymer suspended in textile material contains approximately 128 grams by weight of the solidifying polymer material for an approximate total weight of 384 grams of polymer in the pillow. The textile material is preferably a petro-chemical based fabric such as polypropylene, polyester or nylon. The polymer material is preferably an organic elastomer polymer under the trademark Waste-Set 3200, Waste-Set 3400, Nochar A610, Nochar A650, Enviro-Bond 403, Norsorex APX1, H-100 Environmental Spill Encapsulant or an equivalent.

Ambient temperature and the viscosity of the liquid hydrocarbon to be solidified are the two most critical factors in determining the rate of absorption and the amount of time required to solidify the broad spectrum of liquid hydrocarbons this invention is designed to contain for removal and disposal. To enhance the polymer's effective interaction with pollutants, the pillow's construction utilizes the layering of polymer material and textile material to control the rate of absorption and solidification.

The effectiveness of the pillow is further enhanced with the addition of quilting seams. A longitudinal seam 20 along the center axis of the pillow and lateral seams 21, 22, 23, 24, 25, 26 and 27 perpendicular to the center axis of the pillow provide consolidation points of the internally stratified layers of textile material with the external textile material envelope and forms chambers within the pillow. The consolidation of the internal layers of textile material within the outer envelope speeds migration of the liquid hydrocarbons throughout the interior stratified layers of the pillow via the capillary attraction of the liquid hydrocarbons to the textile material. The lateral seams may also be oriented at an oblique angle to the center axis of the pillow. In either case, a quilted effect is achieved. Also, instead of a longitudinal center axis seam, a plurality of parallel longitudinal seams could be used. Further, the quilting effect may be achieved using a plurality of seams criss-crossing at oblique angles to one another so as to form the pockets in a diamond-shape rather than square or rectangular shapes.

The stratification design allows for optimum efficiency in utilizing the solidifying properties of the polymer. Very light viscosity liquid hydrocarbons react almost instantaneously with the polymer and are exposed to no more polymer than can be fully utilized for absorption and solidification. Stratification promotes rapid migration of light viscosity liquid hydrocarbons throughout the interior of the pillow while slowing migration of the liquid hydrocarbon through the outer surface envelope area and exposure to the polymer. The extremely rapid reaction between the light viscosity liquid hydrocarbon and the polymer could otherwise result in the loose polymer located within the volume of the pillow being surrounded by a non-permeable rubber shell. The resulting surface blockage would thereby prevent the enclosed polymer from being used to solidify additional liquid hydrocarbons.

In addition, the stratification design allows the heavier viscosity liquid hydrocarbons that migrate through the layers of textile material to be suspended inside the pillow awaiting the polymer to absorb them and begin the solidification process.

The properties of the textile material that allow for rapid absorption and migration of all viscosities of liquid hydrocarbons effectively give the device maximum surface area exposure of the polymer through the stratification design.

Additional applications include, but are not limited to, removal of liquid hydrocarbons from bilges of marine vessels, monitor wells, electricity transformers, petrochemical plants and pipelines, aviation fueling facilities and rail and trucking fueling terminals as well as use as a containment and clean-up product for municipal entities charged with eliminating petrochemical spills.

The foregoing description of the preferred embodiment has been for the purpose of explanation and illustration. It will be appreciated by those skilled in the art that many modifications and changes can be made in the structure without departing from the essence of the present invention. Therefore, it is contemplated that the appended claims will cover any modifications or embodiments which fall within the scope of the invention.

What is claimed is:

1. A liquid hydrocarbon absorbent device comprising:
    a pillow having a plurality of chambers formed in stratification therein by internal layers of textile material;
    a polymer material disposed in the chambers having a property of acting to absorb and solidify liquid hydrocarbon substances coming into contact with the pillow and migrating to its interior; and
    a plurality of quilting seams in the pillow defining a multiplicity of hydrocarbon absorption consolidation points therein and subdividing each chamber into distinct hydrocarbon absorption units within the pillow.

2. The device of claim 1 wherein said plurality of quilting seams includes:
    a seam extending longitudinally along the center axis of the pillow; and
    a plurality of seams extending laterally across the pillow from one side to the opposite side and crossing the center axis seam.

3. The device of claim 2 wherein the pillow is rectangular and a seam joinder extends along four contiguous sides.

4. The device of claim 1 wherein the polymer material is an organic elastomer polymer.

5. A liquid hydrocarbon absorbent device comprising:
    a plurality of chambers formed in stratification by layers of textile material;
    a polymer material disposed in the chambers having a characteristic of substantially absorbing and solidifying liquid hydrocarbon substances;
    a series of seams located longitudinally along the center axis of the layers of textile material and laterally in a perpendicular orientation to the center axis of the layers of textile material to form consolidation points of the layers that expose them to contact with liquid hydrocarbon substances and thereby promote migration of liquid hydrocarbons under capillary attraction to the chambers for absorption and solidification by said polymer material; and
    a seam joinder of the peripheries of the layers to promote migration of liquid hydrocarbons under capillary attraction to the chambers.

6. A liquid hydrocarbon absorbent device comprising:
    a pillow having a plurality of stacked layers of textile material forming a plurality of chambers in stratification therein, said plurality of stacked textile material layers dispersively conducting liquid hydrocarbons under capillary attraction into the interior of the pillow;
    a polymer material disposed in the chambers having a characteristic of substantially absorbing and solidifying liquid hydrocarbon substances; and
    a series of seams formed in the pillow, at least one of which is located parallel to the longitudinal center axis of the pillow and others of which are located laterally in a perpendicular orientation to the center axis of the pillow, the sears providing consolidation points of the stacked layers of textile material so as to promote the dispersion of liquid hydrocarbons substantially throughout the interior of the pillow.

7. The device of claim 6 further comprising:
    a seam joinder of the stacked layers of textile material around their periphery.

8. The device of claim 6 wherein the polymer material is an organic elastomer polymer.

9. A liquid hydrocarbon absorbent device comprising:
    a pillow having a plurality of stacked layers of individual polymer-filled bags therein forming a plurality of internal stratified hydrocarbon absorption and solidification chambers, the bags being arranged side-by-side in a matrix in each stacked layer; and
    a pattern of seams formed in the pillow so as to be in substantial registration with the side-by-side intersections of the individual polymer-filled bags, the seams providing consolidation points of the internally stratified chambers so as to dispersively conduct liquid hydrocarbons under capillary attraction substantially throughout the interior of the pillow for absorption and solidification by the polymer material.

10. The device of claim 9 further comprising:
    a seam joinder of the stacked layers of polymer-filled bags around their periphery.

11. The device of claim 9 wherein the polymer material is an organic elastomer polymer.

12. A liquid hydrocarbon absorbent device comprising:

a pillow having a plurality of stacked layers of textile material, said plurality of stacked layers of textile material forming a plurality of chambers in stratification so as to dispersively conduct liquid hydrocarbons under capillary attraction substantially throughout the interior of the pillow;

a polymer material contained within the pillow to absorb and solidify liquid hydrocarbon substances, said polymer material being suspended within the fibers of the textile material; and a series of seams formed in the pillow, at least one of which is located parallel to the longitudinal center axis of the pillow and others of which are located substantially laterally in a perpendicular orientation to the center axis of the pillow, the seams providing consolidation points of the internally stratified chambers so as to promote dispersion of liquid hydrocarbons throughout the interior of the pillow to the polymer material.

13. The device of claim 12 further comprising:

a seam joinder of the stacked layers of polymer suspended within the textile material around their periphery.

14. The device of claim 12 wherein the polymer material is an organic elastomer polymer.

* * * * *